2,708,201

16-HALOPROGESTERONES, THEIR 21-HYDROXY DERIVATIVES AND ESTERS THEREOF

Raymond M. Dodson, Park Ridge, and Paul B. Sollman, Evanston, Ill., assignors to G. D. Searle & Co., Chicago, Ill., a corporation of Illinois No Drawing. Application October 30, 1953,
Serial No. 389,475

10 Claims. (Cl. 260—397.3)

Our invention relates to a new group of 16-halosteroids and, specifically, to 16-haloprogesterones, their 21-hydroxy derivatives and esters thereof, and to methods for their production. The compounds which constitute this invention can be represented by the general structural formula

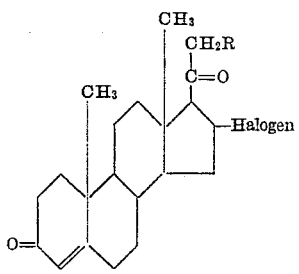

wherein R is a hydrogen, a hydroxy or an esterified hydroxy radical. Suitable esters are those in which R represents a benzoyloxy or a lower alkanoyloxy radical such as formyloxy, acetoxy, propionoxy, butyroxy, valeroxy, or a caproxy radical. R also can represent a lower cycloalkylalkanoyl radical such as cyclohexylacetoxy, cyclopentylpropionoxy and the like.

The compounds of our invention are valuable because of their pharmacological properties. Thus the compounds wherein R is hydrogen have antifolliculoid properties. The 21-oxygenated compounds have valuable mineralocorticoid properties. These compounds are also valuable as intermediates in the organic synthesis of potent hormonal substances possessing the activity of the so-called amorphous fraction of the adrenal cortex. Thus, by transformation of a 16-chloro to a 16-hydroxy group, compounds with electrocortin-like properties are obtained.

These compounds can be prepared conveniently by the following process. A 3-hydroxy-5,16-pregnadien-20-one is treated with a hydrogen halide, such as hydrochloric acid, in an inert organic solvent, such as chloroform, to produce a mixture of the 3-hydroxy-16-halo-5-pregnen-20-one and the 3-hydroxy-5,16-dihalopregnan-20-one. These two steroids, which need not be separated, yield a 16-halo-4-pregnene-3,20-dione on oxidation by the Oppenauer method (cf. C. Djerassi, Organic Reactions, VI, 207–272; 1951). Suitable catalysts for this oxidation are aluminum phenoxide and such aluminum alkoxides as aluminum isopropoxide and t-butoxide. For hydrogen acceptors, such lower alkanones as acetone, butanone, cyclopentanone and cyclohexanone can be used in addition to such aromatic ketones as benzophenone. The reactions are carried out conveniently at the reflux temperature of such lower aromatic hydrocarbon solvents as benzene, toluene and xylene.

The reaction sequence can be represented structurally as follows, X representing a halogen atom:

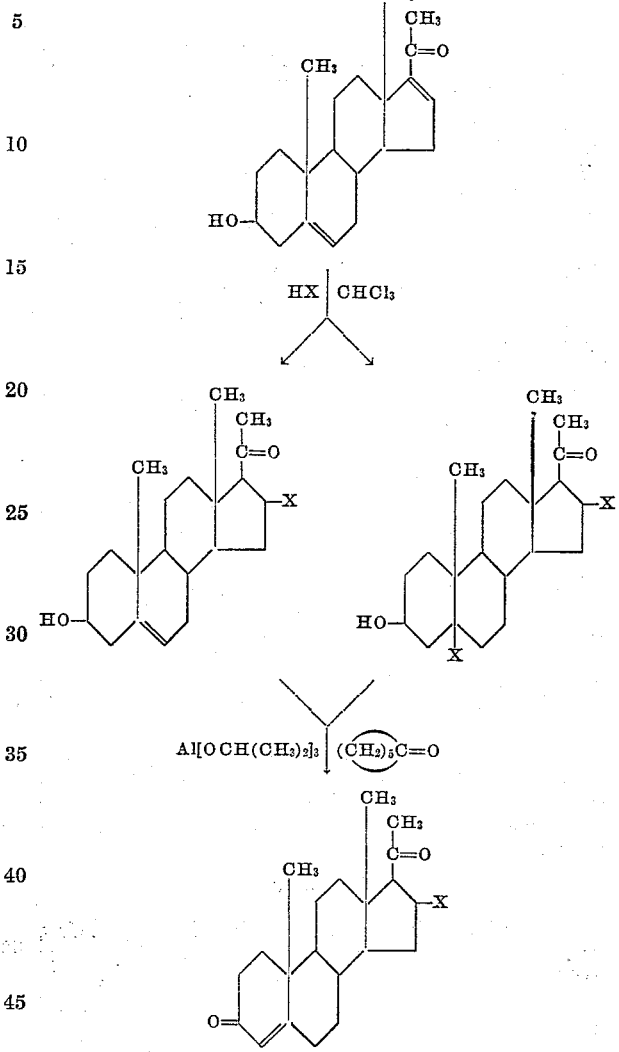

Our invention is disclosed in further detail by the following examples which are set forth for the purpose of illustrating this invention but are in no way to be construed as limiting it in spirit or in scope. It will be apparent to those skilled in the art that many modifications in methods, conditions and materials can be adopted without departing therefrom. In these examples, temperatures are given uncorrected in degrees centigrade (°C.) and quantities in parts by weight.

Example 1

In an atmosphere of nitrogen, a solution of 5.88 parts of sodium in 80 parts of absolute methanol is mixed with 440 parts of benzene, evaporated almost to dryness and cooled. Then 65 parts of freshly distilled ethyl oxalate in 700 parts of anhydrous ether are added. Complete solution occurs. After addition of a solution of 60 parts of 3-hydroxy-5,16-pregnadien-20-one in 1750 parts of anhydrous benzene and 3500 parts of absolute ether, the reaction mixture is stirred in a water bath for 4 hours at 48–51° C. and then cooled to 10° C. The sodium enolate of 3-hydroxy-21-ethoxyoxalyl-5,16-pregnadien-20-one is collected on a filter and washed with dry ether.

Operating again under an atmosphere of nitrogen 41.2 parts of iodine in 800 parts of absolute methanol are added in the course of 15 minutes to a stirred mixture of 71 parts of the above sodio derivative and 640 parts of absolute methanol maintained at −15° C. Stirring is continued for 30 minutes and, while the temperature is still maintained at −15° C., 57.5 parts of a 2.5-N sodium methoxide solution is added dropwise. The reaction mixture is warmed to 20° C. and stirred at that temperature for 15 minutes. It is then filtered and the filtrate is poured into 13,000 parts of water. After standing for an hour, the gelatinous precipitate is collected on a filter and washed with 14% methanol solution.

The moist 3-hydroxy-21-iodo-5,16-pregnadien-3-one thus obtained is boiled in a nitrogen atmosphere with a solution of 64 parts of glacial acetic acid and 105 parts of potassium acetate in 1250 parts of water and 4000 parts of acetone for 5 hours. The mixture is concentrated to 1500 parts, diluted with 11,000 parts of ether and washed repeatedly with dilute sodium bicarbonate solution. The ether layer is concentrated to 220 parts, whereupon the 3-hydroxy-21-acetoxy-5,16-pregnadien-20-one separates. Upon successive recrystallizations from ether and methanol, the product melts at about 177–179° C.

*Example 2*

Into a solution of 30 parts of 3-hydroxy-5,16-pregnadien-20-one in 1900 parts of anhydrous chloroform, dry hydrogen chloride gas is bubbled with continuous agitation for 8 minutes in an ice-water bath. The reaction vessel is stored at 0° C. for several hours after which the solvent is removed under vacuum. The resulting syrup is dissolved in 700 parts of ether. Addition of 880 parts of petroleum ether produces crystallization. Most of the ether is removed under vacuum and the precipitate is collected on a filter and recrystallized from a mixture of ether and petroleum ether. The crystalline product thus obtained melts at about 156–157° C. with decomposition. The product consists of a mixture of 3-hydroxy-16-chloro-5-pregnen-20-one and 3-hydroxy-5,16-dichloro-pregnan-20-one.

*Example 3*

8 parts of the mixed product obtained in the preceding example, 435 parts of anhydrous toluene, 47 parts of freshly distilled cyclohexanone and 40 parts of a 20% solution of aluminum isopropoxide in toluene is heated at reflux temperature for 30 minutes. Then 500 parts of water and 20 parts of potassium sodium tartrate are added and the mixture is steam distilled. The crystalline product is collected on a filter and recrystallized successively from aqueous dioxane, and then from ethanol. The 16-chloroprogesterone thus obtained melts with decomposition at about 197–199° C. The melting point varies with the rate of heating. The ultraviolet absorption spectrum shows a maximum at 240 millimicrons with an extinction coefficient of 15,500.

*Example 4*

A solution of 10 parts of 3-hydroxy-21-acetoxy-5,16-pregnadien-20-one in 750 parts of anhydrous chloroform is chilled in an ice bath and shaken while a stream of anhydrous hydrogen chloride is passed over the surface for 10 minutes. After storage at 0° C. for 12 hours, the solvent is removed under vacuum. The residual oil contains a mixture of 3-hydroxy-16-chloro-21-acetoxy-5-pregnen-20-one and 3-hydroxy-5,16-dichloro-21-acetoxy-pregnan-20-one.

A mixture of 8 parts of this oil, 435 parts of anhydrous toluene, 47 parts of freshly distilled cyclohexanone and 40 parts of a 20% solution of aluminum isopropoxide in toluene is heated at reflux for 30 minutes. Then 500 parts of water and 20 parts of potassium sodium tartrate are added and the mixture is submitted to steam distillation. One part of the oily residue is dissolved in benzene and applied to a chromatography column containing 85 parts of silica gel. The column is rinsed with 450 parts of benzene and then with 450 parts of a 2%, 900 parts of a 5% and 450 parts of a 6% solution of ethyl acetate in benzene. Elution with 1800 parts of an 8% solution of ethyl acetate in benzene and concentration of the eluate in vacuum yields crystalline 16-chloro-21-acetoxyprogesterone which, after two recrystallizations from aqueous dioxane, melts at about 179–181° C. with decomposition.

*Example 5*

3-hydroxy-21-iodo-5,16-pregnadien-20-one, prepared from 41 parts of the sodium enolate of 3-hydroxy-21-ethoxyoxalyl-5,16-pregnadien-20-one, prepared by the procedure described in Example 1, is dissolved, while still moist, in 640 parts of acetone and treated with 72 parts of benzoic acid. The mixture is refluxed under nitrogen with 140 parts of 2.4-N sodium hydroxide solution for 5 hours and concentrated until the crude 3-hydroxy-21-benzoyloxy-5,16-pregnadien-20-one precipitates. The precipitate is collected on a filter, dried and dissolved in 3000 parts of benzene. This solution is poured through a column containing 60 parts of alumina. 20 parts of the benzoate obtained on evaporation of the eluate are dissolved in 1700 parts of anhydrous chloroform. The solution is agitated at 0° C. while a stream of hydrogen chloride is passed through it for 8 minutes. The mixture is stored at 0–5° C. for 5 hours and then concentrated in vacuum to yield an oily mixture of 3-hydroxy--16 - chloro - 21 - benzoyloxy - 5 - pregnen - 20 - one and 3-hydroxy-5,16-dichloro-21-benzoyloxypregnan-20-one. A mixture of 20 parts of this oil, 900 parts of anhydrous toluene, 100 parts of freshly distilled cyclohexanone and 80 parts of a 20% solution of aluminum tertiary butoxide in toluene is refluxed for 30 minutes and then worked up as in Example 4 to yield 16-chloro-21-benzoyloxyprogesterone of the structural formula

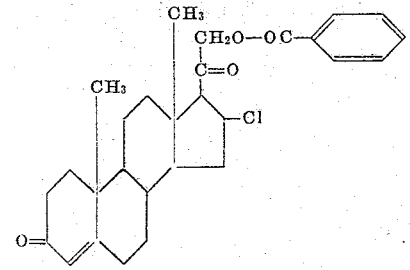

*Example 6*

3 - hydroxy - 21-iodo-5,16-pregnadiene-20-one, prepared from 7 parts of the sodium enolate of 3-hydroxy-21-ethoxyoxalyl-5,16-pregnadien-20-one, prepared by the procedure of Example 1, is dissolved, while still moist, in 320 parts of acetone, treated with 40 parts of β-cyclopentanopropionic acid and 70 parts of 2.4-N sodium hydroxide solution, and boiled under reflux for 4 hours under nitrogen. The mixture is concentrated under vacuum to 50 parts and the precipitate is collected on a filter, dried and dissolved in 1300 parts of benzene. This solution is poured through a column containing 60 parts of alumina. It is then evaporated and the residue is recrystallized from acetone. The hydrated 3-hydroxy-21-(β - cyclopentylpropionyloxy) - 5,16 - pregnadien-20-one melts at about 168–170° C. Substitution of 20 parts of this ester for the 20 parts of the 3-hydroxy-21-benzoyloxy-5,16-pregnadien-20-one in the procedure of the preceding example yields 16-chloro-21-(β-cyclopentylpropionyloxy)progesterone. It has the structural formula

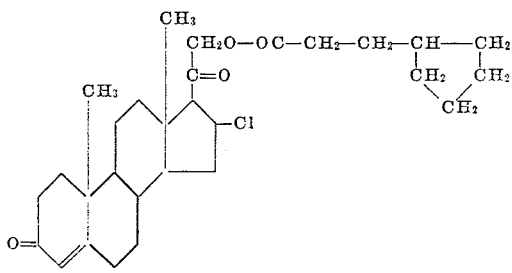

The ultraviolet absorption spectrum shows a maximum at 241 millimicrons with a molecular extinction coefficient of 16,000.

*Example 7*

Substitution of 30 parts of trimethylacetic acid for the 40 parts of β-cyclopentylpropionic acid used in the preceding example yields 3-hydroxy-21-trimethylacetoxy-5,16-pregnadien-20-one which, recrystallized from acetone forms hydrated crystals melting at about 200° C. Continuing with the procedure of the preceding example, there is obtained the 16-chloro-21-trimethylacetoxyprogesterone of the structural formula

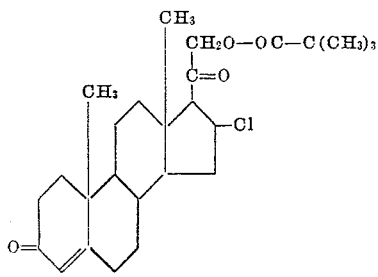

The ultraviolet absorption spectrum shows a maximum at 240 millimicrons with a molecular extinction coefficient of 16,500.

*Example 8*

A stream of hydrogen bromide is passed over an agitated solution of 100 parts of 3-hydroxy-5,16-pregnadien-20-one in 7500 parts of pure, anhydrous chloroform at 0° C. for 10 minutes. After standing for 12 hours at 0° C., the solvent is removed by distillation, leaving a crystalline residue, which is washed with a 2:1 mixture of ether and petroleum ether. The product melts at about 132–136° C. with decomposition. It consists of a mixture of 3-hydroxy-16-bromo-5-pregnen-20-one and 3-hydroxy-5,16-dibromopregnan-20-one.

23 parts of this mixture are refluxed with 870 parts of anhydrous toluene, 87 parts of a 20% solution of aluminum isopropoxide in toluene, and 150 parts of cyclohexanone for 30 minutes. Then 60 parts of potassium sodium tartrate in 1000 parts of water are added and the mixture is steam distilled. The residual crystalline cake is washed with ether and then crystallized twice from ethanol. 16-bromoprogesterone is thus obtained in white crystals melting at about 155–157° C. with decomposition depending on the rate of heating.

*Example 9*

To a solution of 1 part of 16-chloro-21-acetoxy-progesterone in 160 parts of anhydrous methanol is added 1 part of p-toluenesulfonic acid. The mixture is permitted to stand at room temperature for 15 hours, treated with 250 parts of water and extracted with ether. This extract is washed with sodium bicarbonate and then with water, dried and evaporated. The residue is dissolved in benzene and the solution is applied to a chromatography column containing 50 parts of silica gel. The column is washed with benzene and a 5% solution of ethyl acetate in benzene. Elution with a 20% solution of ethyl acetate in benzene and evaporation of the eluate yields the 16-chloro-21-hydroxyprogesterone in white, shining crystals.

Treatment of this product with trimethylacetyl chloride yields the 16-chloro-21-trimethylacetoxyprogesterone; the infrared absorption spectrum is superimposable on that of the product of Example 7.

We claim:

1. A compound of the structural formula

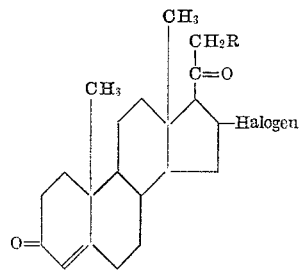

wherein the halogen atom has an atomic weight greater than 30 and smaller than 90 and wherein R is a member of the class consisting of hydrogen, hydroxy, benzoyloxy, (lower alkyl)—COO— and

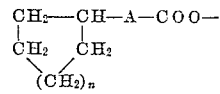

radicals wherein *n* is a positive integer less than 3 and A is a lower alkylene radical.

2. 16-haloprogesterone wherein the halogen atom has an atomic weight greater than 30 and smaller than 90.

3. 16-chloroprogesterone.

4. 16-halo-21-hydroxyprogesterone wherein the halogen atom has an atomic weight greater than 30 and smaller than 90.

5. 16-chloro-21-hydroxyprogesterone.

6. 16 - halo - 21 - (lower alkanoyloxy)progesterone wherein the halogen atom has an atomic weight greater than 30 and smaller than 90.

7. 16-chloro-21-acetoxyprogesterone.

8. 16-halo-21-benzoyloxyprogesterone wherein the halogen atom has an atomic weight greater than 30 and smaller than 90.

9. 16-chloro-21-benzoyloxyprogesterone.

10. 16 - halo - 21 - cyclopentylpropionoxyprogesterone wherein the halogen atom has an atomic weight greater than 30 and smaller than 90.

References Cited in the file of this patent

UNITED STATES PATENTS 2,369,065    Marker _____ Feb. 6, 1945